United States Patent
Park

(10) Patent No.: US 10,815,869 B2
(45) Date of Patent: Oct. 27, 2020

(54) VEHICULAR COOLANT FLOW SYSTEM AND METHOD FOR CONTROLLING SAME

(71) Applicants: Hyundai Motor Company, Seoul (KR); Kia Motors Corporation, Seoul (KR)

(72) Inventor: Ji Yeol Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/200,069

(22) Filed: Nov. 26, 2018

(65) Prior Publication Data
US 2020/0109657 A1 Apr. 9, 2020

(30) Foreign Application Priority Data
Oct. 5, 2018 (KR) .................. 10-2018-0119275

(51) Int. Cl.
| F01P 7/10 | (2006.01) |
| F01P 7/16 | (2006.01) |
| F01P 3/20 | (2006.01) |
| F01P 11/20 | (2006.01) |
| F01P 11/16 | (2006.01) |
| F01P 7/14 | (2006.01) |

(52) U.S. Cl.
CPC .............. F01P 7/165 (2013.01); F01P 3/20 (2013.01); F01P 11/16 (2013.01); F01P 11/20 (2013.01); F01P 2007/146 (2013.01); F01P 2025/40 (2013.01)

(58) Field of Classification Search
CPC ........... B60H 2001/00307; B60H 2001/00961; B60H 1/00385; F01P 2050/24; F01P 3/20
See application file for complete search history.

(56) References Cited

U.S. PATENT DOCUMENTS

| 2012/0102995 A1* | 5/2012 | Sakata ................. B60L 3/0061 62/238.1 |
| 2012/0183815 A1* | 7/2012 | Johnston ................. B60L 58/27 429/50 |

(Continued)

FOREIGN PATENT DOCUMENTS

KR 101786670 B1 10/2017

*Primary Examiner* — Long T Tran
(74) *Attorney, Agent, or Firm* — Mintz Levin Cohn Ferris Glovsky and Popeo, P.C.; Peter F. Corless

(57) ABSTRACT

A vehicular coolant flow system includes: a main cooling circuit configured to circulate a coolant through a power electronic device mounted on a vehicle so as to cool the power electronic device; a heat-radiating device provided in the main cooling circuit so as to cool the coolant; a bypass circuit that branches off at a point between the power electronic device of the main cooling circuit and the heat-radiating device, bypasses the heat-radiating device, and merges with the main cooling circuit; a heating device connected to the bypass circuit and heated by the coolant that has cooled the power electronic device; a first adjustment valve positioned at a point at which the bypass circuit branches off from the main cooling circuit or merges with the main cooling circuit; and a controller that controls the first adjustment valve so as to adjust a flow rate of the coolant supplied to the bypass circuit.

8 Claims, 2 Drawing Sheets

(56) References Cited

U.S. PATENT DOCUMENTS

| | | | |
|---|---|---|---|
| 2015/0101789 A1* | 4/2015 | Enomoto | B60L 50/16 165/202 |
| 2015/0338173 A1* | 11/2015 | Katoh | F28D 1/0435 165/172 |
| 2016/0023532 A1* | 1/2016 | Gauthier | B60L 1/06 62/243 |
| 2016/0318370 A1* | 11/2016 | Rawlinson | B60L 58/26 |
| 2018/0050605 A1* | 2/2018 | Lewis | B60H 1/004 |
| 2018/0257453 A1* | 9/2018 | Haug | B60H 1/00385 |
| 2018/0319254 A1* | 11/2018 | Hotzel | B60H 1/32281 |

* cited by examiner

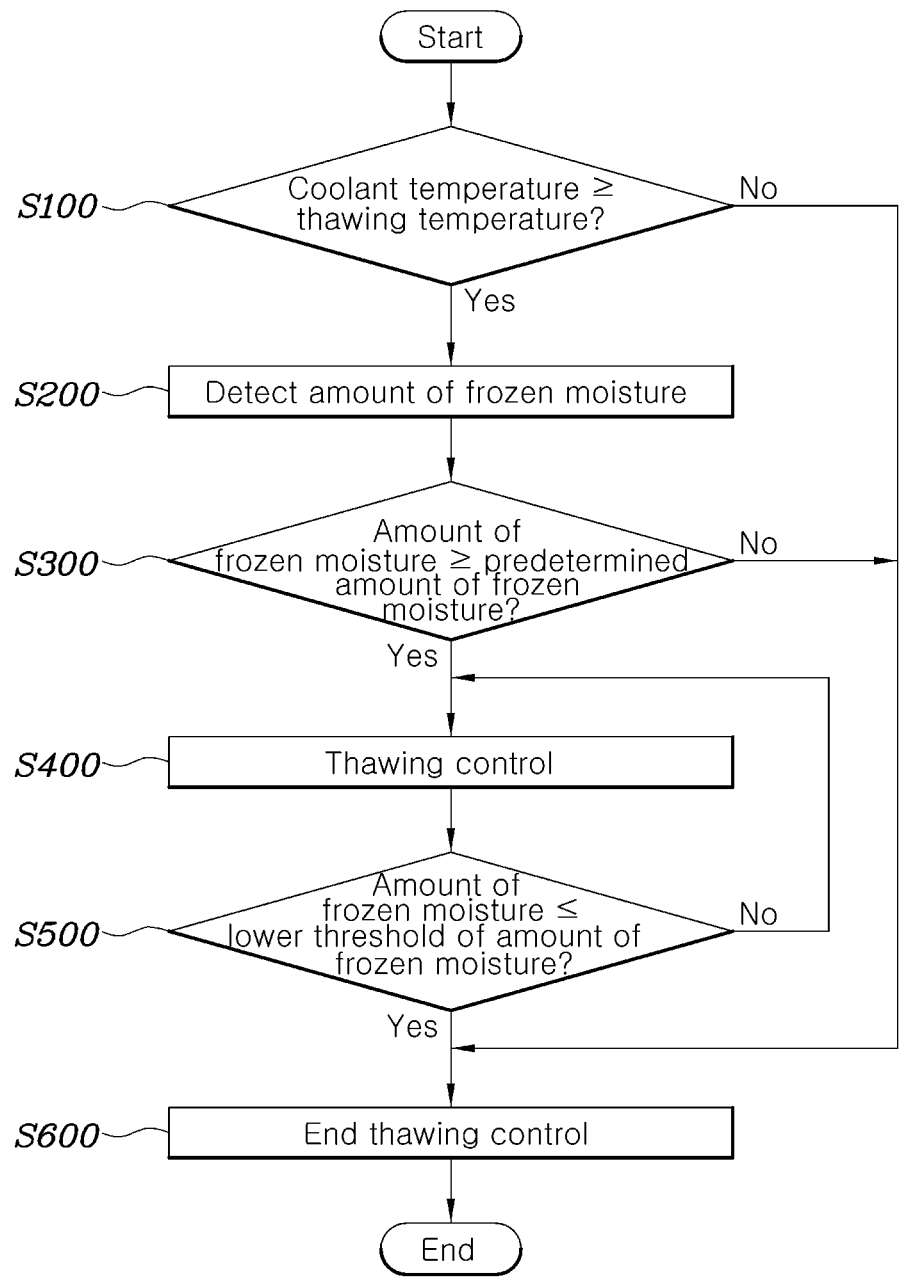

VEHICULAR COOLANT FLOW SYSTEM AND METHOD FOR CONTROLLING SAME

CROSS REFERENCE TO RELATED APPLICATION

The present application claims under 35 U.S.C. § 119(a) the benefit of Korean Patent Application No. 10-2018-0119275, filed on Oct. 5, 2018, the entire contents of which are incorporated by reference herein.

BACKGROUND

1. Technical Field

The present disclosure relates to a vehicular coolant flow system and a method for controlling the same, more particularly, to an arrangement for removing frozen moisture on an outside of a vehicle using the vehicular coolant flow system that cools a power electronic device.

2. Description of the Related Art

An internal combustion engine vehicle employing a conventional engine includes an engine that emits a large amount of heat energy, and the maximum temperature of the engine exceeds 100° C. during driving. Accordingly, the temperature of an engine room is maintained comparatively high.

However, an electric vehicle (EV) driven by a motor, a fuel cell electric vehicle (FCEV), or the like does not include an engine, but includes only a power electronic device that emits a comparatively small amount of heat energy.

This causes a problem in that, when moisture is frozen on an outside of the vehicle after rain or a frost, for example, the frozen moisture may adhere to an engine room hood (bonnet), headlights, a license plate, and the like and may not thaw.

In the case of the engine room hood, in particular, the weight of the vehicle is increased when snow accumulates over a large area, or when frozen moisture adheres over a large area, thereby decreasing fuel efficiency. In the case of headlights, light may be blocked by frozen moisture, making it difficult to ensure a full field of view. In the case of the license plate, frozen moisture may make recognition thereof impossible, making it difficult to identify the vehicle.

Therefore, there is a need for a technology for thawing and removing moisture that may be frozen and adhered to a front part of a vehicle driven by a motor, including the engine room hood, the headlights, and the license plate.

The above descriptions provided as background technologies are solely for the purpose of improving the understanding of the background of the present disclosure, and are not to be regarded by a person skilled in the art as corresponding to a widely known prior art.

SUMMARY

The present disclosure provides an arrangement for removing frozen moisture provided on the front part of a vehicle using a coolant heated by a power electronic device of a coolant flow system of the vehicle.

A vehicular coolant flow system according to an aspect of the present disclosure includes: a main cooling circuit configured to circulate a coolant through a power electronic device mounted on a vehicle so as to cool the power electronic device; a heat-radiating device provided in the main cooling circuit so as to cool the coolant; a bypass circuit that branches off at a point between the power electronic device of the main cooling circuit and the heat-radiating device, bypasses the heat-radiating device, and merges with the main cooling circuit; a heating device connected to the bypass circuit and heated by the coolant that has cooled the power electronic device; a first adjustment valve positioned at a point at which the bypass circuit branches off from the main cooling circuit or merges with the main cooling circuit; and a controller that controls the first adjustment valve so as to adjust a flow rate of the coolant supplied to the bypass circuit.

The power electronic device may be at least one selected from a motor, an inverter, and an on-board charger which generate heat during operation as a result of power supplied while being mounted on the vehicle.

The vehicular coolant flow system may further include a detection sensor that detects frozen moisture on the heating device exposed to an outside of the vehicle, and the controller may control the first adjustment valve on the basis of the frozen moisture detected by the detection sensor.

The vehicular coolant flow system may further include: a battery cooling circuit configured to circulate the coolant through a battery module mounted on the vehicle so as to cool the battery module; a heater provided in the battery cooling circuit so as to heat the coolant; a second adjustment valve positioned at a point at which the battery cooling circuit merges with the main cooling circuit; and a third adjustment valve positioned at a point at which the battery cooling circuit branches off from the main cooling circuit. The controller may control the second adjustment valve so as to control a flow rate of the coolant supplied from the battery cooling circuit to the main cooling circuit, and the controller may control the third adjustment valve so as to adjust a flow rate of the coolant supplied from the main cooling circuit to the battery cooling circuit.

A method for controlling the vehicular coolant flow system according to an aspect of the present disclosure includes: determining whether there is a need to heat the heating device by the coolant in the main cooling circuit or not; and controlling the first adjustment valve so as to increase the flow rate of the coolant supplied to the bypass circuit when it is determined that there is a need to heat the heating device.

The vehicular coolant flow system control method may further include controlling the first adjustment valve so as to block the coolant supplied to the bypass circuit when it is determined that there is no need to heat the heating device.

In the determining whether there is a need to heat the heating device or not, it may be determined that there is a need to heat the heating device when frozen moisture detected by a detection sensor that detects frozen moisture on the heating device exposed to an outside of the vehicle is equal to or higher than a predetermined amount of frozen moisture.

The vehicular coolant flow system control method may further include determining whether the temperature of the coolant in the main cooling circuit is equal to or higher than a predetermined thawing temperature or not, prior to the determining whether there is a need to heat the heating device or not.

A method for controlling the vehicular coolant flow system according to an aspect of the present disclosure includes: determining whether there is a need to heat the heating device by the coolant in the main cooling circuit or not; controlling the first adjustment valve so as to increase the flow rate of the coolant supplied to the bypass circuit when it is determined that there is a need to heat the heating device; and controlling the second adjustment valve and the third adjustment valve so as to increase the flow rate of the coolant supplied from the battery cooling circuit to the main cooling circuit and to increase the flow rate of the coolant supplied from the main cooling circuit to the battery cooling circuit.

In the controlling the second adjustment valve and the third adjustment valve, the heater may be controlled to heat the coolant in the battery cooling circuit.

The vehicular coolant flow system and the method for controlling the same, according to the present disclosure, are advantageous in that an increase in the weight of the vehicle is prevented by removing frozen moisture on the engine room hood, thereby improving the fuel efficiency.

In addition, a full field of view is secured during nighttime driving by removing frozen moisture on the headlights, thereby ensuring safe driving.

In addition, frozen moisture on the license plate is removed to avoid a situation in which the license plate cannot be recognized.

BRIEF DESCRIPTION OF THE DRAWINGS

The above and other aspects, features and advantages of the present disclosure will be more apparent from the following detailed description taken in conjunction with the accompanying drawings, in which:

FIG. 2 is a flowchart of a method for controlling the vehicular coolant flow system according to an embodiment of the present disclosure.

DETAILED DESCRIPTION OF THE EXEMPLARY EMBODIMENTS

Figure 1:
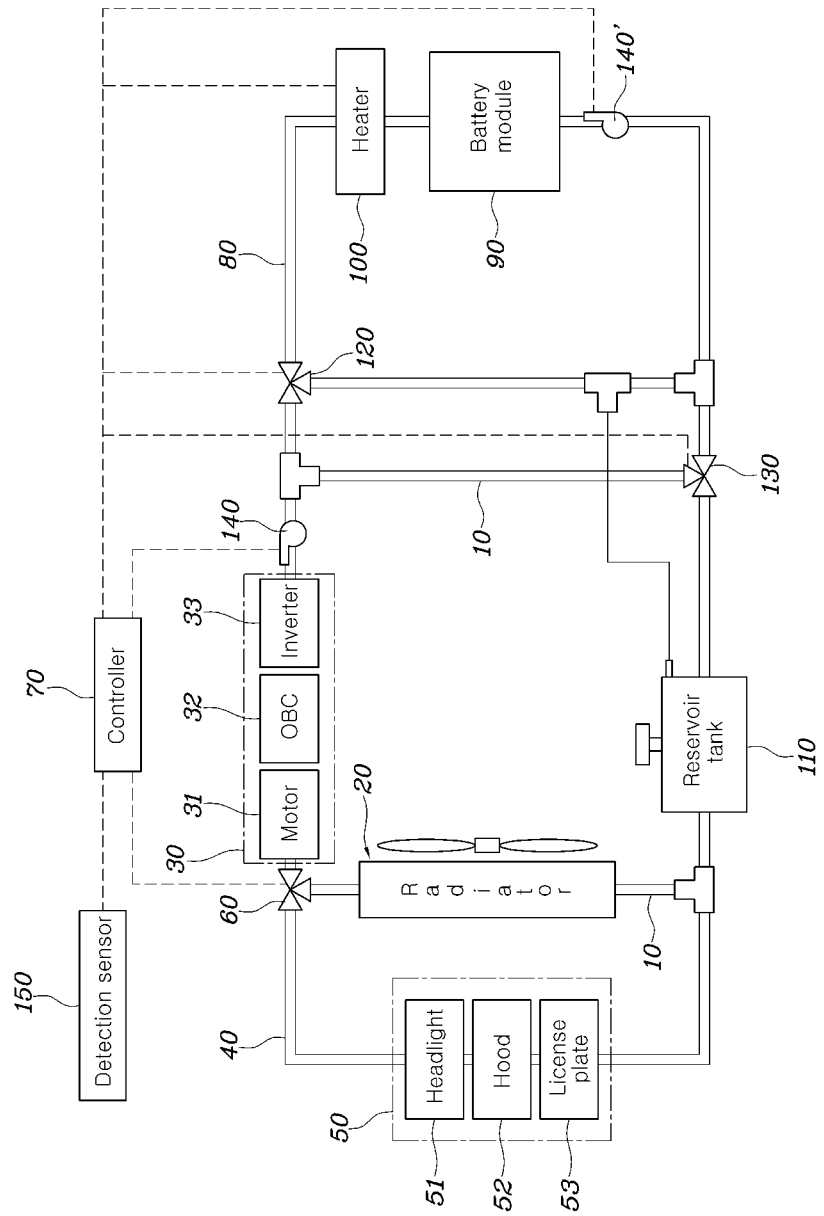
FIG. 1 is a schematic view of a configuration of a vehicular coolant flow system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, a preferred embodiment of the present disclosure will be described in detail with reference to the accompanying drawings. Similar reference numerals presented in the drawings denote similar elements.

FIG. 1 is a schematic view of a configuration of a vehicular coolant flow system according to an embodiment of the present disclosure.

Referring to FIG. 1, a vehicular coolant flow system according to an embodiment of the present disclosure includes: a main cooling circuit 10 configured to circulate a coolant through a power electronic device 30 mounted on a vehicle so as to cool the same; a heat-radiating device 20 provided in the main cooling circuit 10 so as to cool the coolant; a bypass circuit 40 that branches off at a point between the power electronic device 30 of the main cooling circuit 10 and the heat-radiating device 20, bypasses the heat-radiating device 20, and merges with the main cooling circuit 10; a heating device 50 connected to the bypass circuit 40 and heated by the coolant that has cooled the power electronic device 30; a first adjustment valve 60 positioned at a point at which the bypass circuit 40 branches off from the main cooling circuit 10 or merges therewith; and a controller 70 that controls the first adjustment valve 60 so as to adjust a flow rate of the coolant supplied to the bypass circuit 40.

The main cooling circuit 10 is a coolant passage that supplies a coolant to the power electronic device 30 mounted on the vehicle so as to cool the same. Particularly, the main cooling circuit includes coolant pumps 140 and 140' that circulate the coolant, a heat-radiating device 20, and the like. The power electronic device 30 connected to the main cooing circuit 10 and cooled thereby includes a motor 31 for driving the vehicle, an on-board charger (OBC) 32, an inverter 33, and the like.

The heat-radiating device 20 may include a heat exchanger, such as a radiator, which exchanges heat with an outside of the vehicle, a heat-radiating fan for circulating air around the radiator, and the like. The heat-radiating device 20 exchanges heat with external air having a low temperature, thereby cooling the heated coolant.

In the case of an internal combustion engine vehicle, the same is equipped with a heat source (engine) that emits heat energy at a high temperature (100° C. or higher). Particularly, when the engine room is formed on the front part of the vehicle, the front part of the vehicle is heated by heat transfer, such as convection.

However, when the vehicle is driven by the motor 31, i.e., the engine is replaced with a heat source (motor) 31 that emits heat energy at a comparatively low temperature, the front part of the vehicle may be heated insufficiently. Accordingly, if snow accumulates on the front part of the vehicle, the snow does not melt, causing the problem of reduced fuel efficiency, stability degradation, and the like.

Therefore, a heating device 50 is arranged on the front part of the vehicle through the bypass circuit 40 that bypasses the heat-radiating device 20 from the main cooling circuit 10 such that the front part of the vehicle can be heated directly. Particularly, the bypass circuit 40 branches off at a point between the power electronic device 30 and the heat-radiating device 20 such that the coolant heated by the power electronic device 30 can be supplied to the bypass circuit 40.

Accordingly, the coolant can be cooled even if the same does not pass through the heat-radiating device 20, and the heating device 50 can be heated by the coolant heated by the power electronic device 30.

The first adjustment valve 60 is positioned at a point at which the bypass circuit 40 branches off from the main cooling circuit 10 or at a point at which the bypass circuit 40 branches off from the main cooling circuit 10 and again merges therewith. The first adjustment valve 60 may be controlled by the controller 70 so as to adjust a flow rate of the coolant supplied from the main cooling circuit 10 to each of the bypass circuit 40 and the heat-radiating circuit 20. As shown, when the first adjustment valve 60 is positioned at a point at which the bypass circuit 40 branches off from the main cooling circuit 10, a T-branch or a Y-branch may be formed at a point at which the bypass circuit 40 branches off from the main cooling circuit 10 and again merges therewith, thereby connecting the three coolant circuits.

Accordingly, when the controller 70 determines that there is a need to heat the heating device 50, the degree of openness of the first valve may be adjusted to control the amount of heat generated by the heating device 50. Therefore, frozen moisture, such as snow, accumulated on the front part of the vehicle can be thawed and removed by the heating device 50.

The vehicular coolant flow system may further include coolant pumps 140 and 140' that provide power for circulating the coolant along the cooling circuit; and a reservoir tank 110 connected to the main cooling circuit 10 so as to add the coolant to the main cooling circuit 10. The coolant is stored in the reservoir tank 110, and the reservoir tank 110 is connected to the main cooling circuit 10 and to a battery cooling circuit 80 (to be described later) such that the coolant can be added. The coolant pumps 140 and 140' may be separately included in the main cooling circuit 10 and the battery cooling circuit 80 (to be described later), respectively. The RPM or the like of the coolant pumps 140 and 140' included in the main cooling circuit 10 and the battery cooling circuit 80, respectively, may be controlled by the controller 70. When the heating device 50 is heated by circulating the coolant through the bypass circuit 40, the RPM of the coolant pumps 140 and 140' may be controlled to increase additionally in view of the same.

The power electronic device 30 may be at least one selected from a motor 31, an inverter 33, and an OBC 32, which generate heat during operation as a result of power supplied while the same are mounted on the vehicle. Alternatively, the power electronic device 30 may include all of the motor 31, the inverter 33, and the OBC 32, and the coolant may pass through the entire power electronic device 30 and be supplied to the bypass circuit 40. In this case, a larger amount of heat energy is supplied to the heating device 50 such that frozen moisture on the outside of the vehicle can be thawed rapidly.

The vehicular coolant flow system may further include a detection sensor 150 for detecting frozen moisture on the heating device 50 exposed to the outside of the vehicle, and the controller 70 may control the first adjustment valve 60 on the basis of the frozen moisture detected by the detection sensor 150.

The detection sensor 150 may detect frozen moisture on the vehicle hood 52, the headlights 51, or the license plate 53. Specifically, a weight sensor for detecting the load may detect a load increase due to snow accumulation, and a light sensor may be used for the headlights 51 so as to detect the amount of transmitted light or the amount of reflected light. Alternatively, a laser sensor may be used to directly detect frozen moisture on the outside of the vehicle.

When the amount of frozen moisture is equal to or larger than a predetermined amount of frozen moisture on the basis of the frozen moisture detected by the detection sensor 150, the controller 70 may control the first adjustment valve 60 such that the coolant flows, thereby thawing the frozen moisture by the heating device 50.

The vehicular coolant flow system may further include: a battery cooling circuit 80 for circulating the coolant through a battery module 90 mounted on the vehicle so as to cool the same; a heater 100 provided in the battery cooling circuit 80 so as to heat the coolant; a second adjustment valve 120 positioned at a point at which the battery cooling circuit 80 merges with the main cooling circuit 10; and a third adjustment valve 130 positioned at a point at which the battery cooling circuit 80 branches off from the main cooling circuit 10. The controller 70 may control the second adjustment valve 120 so as to adjust a flow rate of the coolant supplied from the battery cooling circuit 80 to the main cooling circuit 10. The controller 70 may control the third adjustment valve 130 so as to adjust a flow rate of the coolant supplied from the main cooling circuit 10 to the battery cooling circuit 80.

The battery cooling circuit 80 may be formed separately to cool the battery module 90 including a battery which is charged by power supplied from outside the vehicle through the OBC 32 or the like, and which discharges power and supplies the same to the motor 31 or the like.

The battery cooling circuit 80 may further include a heater 100 for heating the coolant in the battery cooling circuit 80. The heater 100 may heat the coolant by generating heat such that the temperature of the coolant increases rapidly.

The battery cooling circuit 80 may be connected to and communicate with the main cooling circuit 10 such that the coolant can flow into and out of the same. Additionally, the battery cooling circuit 80 may be connected to the reservoir tank 110 of the main cooling circuit 10.

Specifically, the second adjustment valve 120 and the third adjustment valve 130 may be additionally positioned at a point at which the battery cooling circuit 80 merges with the main cooling circuit 10 and at a point at which the battery cooling circuit 80 branches off from the main cooling circuit 10, respectively, such that the flow of the coolant between the battery cooling circuit 80 and the main cooling circuit 120 can be controlled.

Particularly, a larger amount of heat energy may be supplied to the heating device 50 through the following configuration: after passing through the heater 100 of the battery cooling circuit 80 and the battery module 90, the coolant is directly supplied to the power electronic device 30 of the main cooling circuit 10; the coolant primarily heated by the heater 100 and the battery module 90 is heated by the power electronic device 30 secondarily; and the coolant is then supplied to the heating device 50.

The controller 70 may control the second adjustment valve 120 and the third adjustment valve 130 so as to adjust the flow rate of the coolant supplied from the main cooling circuit 10 to the battery cooling circuit 80. Particularly, the controller 70 may control the second adjustment valve 120 and the third adjustment valve 130 in view of the need to heat the heating device 50 on the basis of the detection sensor 150, or in view of the need to cool the coolant by the heat-radiating device 20 according to the temperature of the coolant heated by the heater 100 and the battery module 90. In addition, the controller 70 may control heat generated by the heater 100 in order to heat the heating device 50. The specific control method by the controller 70 will be described below.

FIG. 2 is a flowchart of a method for controlling the vehicular coolant flow system according to an embodiment of the present disclosure.

Referring to FIG. 2, the method for controlling the vehicular coolant flow system according to an embodiment of the present disclosure includes: a step (S300) of determining whether there is a need to heat the heating device by the coolant in the main cooling circuit or not; and a step (S400) of controlling the first adjustment valve such that the flow rate of the coolant supplied to the bypass circuit increases when it is determined that there is a need to heat the heating device.

That is, when it is determined that there is a need to heat the heating device, the first adjustment valve is controlled to heat the heating device by increasing the flow rate of the coolant supplied to the bypass circuit. The degree of opening of the first adjustment valve may be controlled according to the extent of the need to heat the heating device.

This is advantageous in that frozen moisture on the outside of the vehicle can be removed by heating the heating device using the coolant in the main cooling circuit, which has been heated by the power electronic device.

The method may further include a step (S600) of controlling the first adjustment valve so as to block the supply of the coolant to the bypass circuit when it is determined that there is no need to heat the heating device. Specifically, the flow of the coolant through the bypass circuit may be blocked wherein there is no need to heat the heating device, and the coolant may be allowed to flow through the bypass circuit only when there is a need to heat the heating device.

Accordingly, when there is no need to heat the heating device (in a normal driving situation), the flow of the coolant through the bypass circuit may be blocked, and heat may be released from the coolant through the heat-radiating device, thereby cooling the power electronic device appropriately.

In another embodiment, when the heat-radiating performance of the heat-radiating device is insufficient although there is no need to heat the heating device, the coolant may be allowed to flow through the bypass circuit such that the heat-radiating performance can be improved through the heating device.

In the step (S300) of determining whether there is a need to heat the heating device or not, it may be determined that there is a need to heat the heating device when the amount of frozen moisture sensed (S200) by the detection sensor, which detects frozen moisture on the heating device exposed to the outside of the vehicle, is equal to or larger than a predetermined amount of frozen moisture.

The detection sensor may have various embodiments as described above. It may be determined that there is a need to heat the heating device when the detection sensor detects the amount of frozen moisture (S200), and when the detected mount of frozen moisture is equal to or larger than the predetermined amount of frozen moisture (for example, snow accumulation of 1 cm).

This is advantageous in that the heating device can be heated only when necessary, by determining whether frozen moisture on the headlights positioned on the front part of the vehicle, the hood, the license plates, and the like needs to be removed.

The method may further include a step (S100) of determining whether the temperature of the coolant in the main cooling circuit is equal to or higher than a predetermined thawing temperature or not, prior to the step (S300) of determining whether there is a need to heat the heating device or not.

The predetermined thawing temperature may be set to be an appropriate temperature above 0° C. (for example, 30° C.) at which frozen moisture on the outside of the vehicle can be thawed. A temperature sensor may be further provided at a point between the power electronic device of the main cooling circuit and the heat-radiating device so as to sense the temperature of the coolant in the main cooling circuit and to determine whether the same is equal to or higher than the predetermined thawing temperature or not.

As such, the temperature of coolant in the main cooling circuit is sensed, and the heating device is heated accordingly, making it unnecessary to circulate the coolant through the bypass circuit, and thereby heating the heating device more efficiently.

The first adjustment valve may be controlled so as not to supply the coolant to the bypass circuit (S600) when the temperature of the coolant in the main cooling circuit is below the thawing temperature.

In another embodiment, the second adjustment valve and the third adjustment valve may be controlled such that the coolant flows into and out of the battery cooling circuit, and the heater may be additionally controlled to heat the coolant.

The coolant may be controlled to be supplied to the bypass circuit until the amount of frozen moisture detected by the detection sensor becomes equal to or higher than the predetermined amount of frozen moisture. When the detected amount of frozen moisture is equal to or lower than the predetermined lower threshold of the amount of frozen moisture (S500), the first adjustment valve may be controlled to block the supply of the coolant to the bypass circuit, thereby ending the thawing control (S600).

The method for controlling a vehicular coolant flow system having a battery cooling circuit connected to the main cooling circuit includes: a step (S300) of determining whether there is a need to heat the heating device by the coolant in the main cooling circuit or not; a step (S400) of controlling the first adjustment valve such that the flow rate of the coolant supplied to the bypass circuit increases when it is determined that there is a need to heat the heating device; and a step (S400) of controlling the second adjustment valve and the third adjustment valve so as to increase the flow rate of the coolant supplied from the battery cooling circuit to the main cooling circuit and the flow rate of the coolant supplied from the main cooling circuit to the battery cooling circuit.

In the step (S400) of controlling the second adjustment valve and the third adjustment valve, the same are controlled to decrease the flow rate of the coolant circulated through the battery cooling circuit itself and to increase the flow rate of the coolant that flows out of the main cooling circuit, circulates through the main cooling circuit, and flows into the battery cooling circuit again. Accordingly, the coolant is additionally heated by the battery module and the heater and is supplied to the heating device, thereby increasing the heat energy supplied to the heating device.

In the step (S400) of controlling the second adjustment valve and the third adjustment valve, the heater may be controlled to heat the coolant in the battery cooling circuit. Particularly, when the temperature of the coolant, which has passed through the power electronic device, is lower than the predetermined thawing temperature, or when the temperature of the coolant in the main cooling circuit is lower than the predetermined thawing temperature in spite of being heated by the battery module additionally, the heater may be controlled to generate heat.

As the coolant in the battery cooling circuit is heated by the heater, the temperature of the coolant in the main cooling circuit is additionally increased, advantageously making it possible to heat the heating device rapidly.

Although the present disclosure has been described and illustrated with reference to the particular embodiments thereof, it will be apparent to those skilled in the art that various improvements and modifications of the present disclosure can be made without departing from the technical idea of the present disclosure provided by the following claims.

What is claimed is:

1. A vehicular coolant flow system, comprising:
   a main cooling circuit configured to circulate a coolant through a power electronic device mounted on a vehicle so as to cool the power electronic device;
   a heat-radiating device provided in the main cooling circuit so as to cool the coolant;
   a bypass circuit that branches off at a point between the power electronic device of the main cooling circuit and the heat-radiating device, bypasses the heat-radiating device, and merges with the main cooling circuit;
   a heating device arranged on a front part of the vehicle and connected to the bypass circuit and heated by the coolant that has cooled the power electronic device;
   a first adjustment valve positioned at a point at which the bypass circuit branches off from the main cooling circuit or merges with the main cooling circuit;
   a controller that controls the first adjustment valve so as to adjust a flow rate of the coolant supplied to the bypass circuit; and
   a detection sensor that detects frozen moisture on the heating device exposed to an outside of the vehicle,
   wherein the controller controls the first adjustment valve on the basis of the frozen moisture detected by the detection sensor.

2. The vehicular coolant flow system of claim 1, wherein the power electronic device is at least one selected from a motor, an inverter, and an on-board charger which generate heat during operation as a result of power supplied while being mounted on the vehicle.

3. The vehicular coolant flow system of claim 1, further comprising:
   a battery cooling circuit configured to circulate the coolant through a battery module mounted on the vehicle so as to cool the battery module;
   a heater provided in the battery cooling circuit so as to heat the coolant;
   a second adjustment valve positioned at a point at which the battery cooling circuit merges with the main cooling circuit; and
   a third adjustment valve positioned at a point at which the battery cooling circuit branches off from the main cooling circuit, wherein
   the controller controls the second adjustment valve so as to control a flow rate of the coolant supplied from the battery cooling circuit to the main cooling circuit, and the controller controls the third adjustment valve so as to adjust a flow rate of the coolant supplied from the main cooling circuit to the battery cooling circuit.

4. A vehicular coolant flow system control method, the control method comprising:
   providing a vehicular coolant flow system including:
   a main cooling circuit configured to circulate a coolant through a power electronic device mounted on a vehicle so as to cool the power electronic device;
   a heat-radiating device provided in the main cooling circuit so as to cool the coolant;
   a bypass circuit that branches off at a point between the power electronic device of the main cooling circuit and the heat-radiating device, bypasses the heat-radiating device, and merges with the main cooling circuit;
   a heating device arranged on a front part of the vehicle and connected to the bypass circuit and heated by the coolant that has cooled the power electronic device;
   a first adjustment valve positioned at a point at which the bypass circuit branches off from the main cooling circuit or merges with the main cooling circuit;
   a controller that controls the first adjustment valve so as to adjust a flow rate of the coolant supplied to the bypass circuit; and
   a detection sensor that detects frozen moisture on the heating device exposed to an outside of the vehicle, determining whether or not there is a need to heat the heating device by the coolant in the main cooling circuit; and controlling the first adjustment valve so as to increase the flow rate of the coolant supplied to the bypass circuit when it is determined that there is a need to heat the heating device, wherein, in determining whether or not there is a need to heat the heating device, it is determined that there is a need to heat the heating device when frozen moisture detected by the detection sensor is equal to or higher than a predetermined amount of frozen moisture.

5. The vehicular coolant flow system control method of claim 4, further comprising controlling the first adjustment valve so as to block the coolant supplied to the bypass circuit when it is determined that there is no need to heat the heating device.

6. The vehicular coolant flow system control method of claim 4, further comprising determining whether the temperature of the coolant in the main cooling circuit is equal to or higher than a predetermined thawing temperature or not, prior to the determining whether there is a need to heat the heating device or not.

7. A vehicular coolant flow system control method, the control method comprising:
providing a vehicular coolant flow system including:
a main cooling circuit configured to circulate a coolant through a power electronic device mounted on a vehicle so as to cool the power electronic device;
a heat-radiating device provided in the main cooling circuit so as to cool the coolant;
a bypass circuit that branches off at a point between the power electronic device of the main cooling circuit and the heat-radiating device, bypasses the heat-radiating device, and merges with the main cooling circuit;
a heating device arranged on a front part of the vehicle and connected to the bypass circuit and heated by the coolant that has cooled the power electronic device;
a first adjustment valve positioned at a point at which the bypass circuit branches off from the main cooling circuit or merges with the main cooling circuit;
a controller that controls the first adjustment valve so as to adjust a flow rate of the coolant supplied to the bypass circuit;
a battery cooling circuit configured to circulate the coolant through a battery module mounted on the vehicle so as to cool the battery module;
a heater provided in the battery cooling circuit so as to heat the coolant;
a second adjustment valve positioned at a point at which the battery cooling circuit merges with the main cooling circuit;
a third adjustment valve positioned at a point at which the battery cooling circuit branches off from the main cooling circuit; and
a detection sensor that detects frozen moisture on the heating device exposed to an outside of the vehicle, wherein
the controller controls the second adjustment valve so as to control a flow rate of the coolant supplied from the battery cooling circuit to the main cooling circuit, and the controller controls the third adjustment valve so as to adjust a flow rate of the coolant supplied from the main cooling circuit to the battery cooling circuit;
determining whether or not there is a need to heat the heating device by the coolant in the main cooling circuit;
controlling the first adjustment valve so as to increase the flow rate of the coolant supplied to the bypass circuit when it is determined that there is a need to heat the heating device; and
controlling the second adjustment valve and the third adjustment valve so as to increase the flow rate of the coolant supplied from the battery cooling circuit to the main cooling circuit and to increase the flow rate of the coolant supplied from the main cooling circuit to the battery cooling circuit,
wherein, in determining whether or not there is a need to heat the heating device, it is determined that there is a need to heat the heating device when frozen moisture detected by the detection sensor s equal to or higher than a predetermined amount of frozen moisture.

8. The vehicular coolant flow system control method of claim 7, wherein, in controlling the second adjustment valve and the third adjustment valve, the heater is controlled to heat the coolant in the battery cooling circuit.

* * * * *